United States Patent [19]

Hein

[11] 4,384,990

[45] May 24, 1983

[54] URANYL NITRATE POURING SOLUTION FOR PRODUCING NUCLEAR FUEL PARTICLES AND A METHOD FOR ITS PREPARATION

[75] Inventor: Kurt Hein, Jülich, Fed. Rep. of Germany

[73] Assignee: Kernforschungsanlage Jülich GmbH, Jülich, Fed. Rep. of Germany

[21] Appl. No.: 154,449

[22] Filed: May 29, 1980

[30] Foreign Application Priority Data

Jun. 2, 1980 [DE] Fed. Rep. of Germany ....... 2922686

[51] Int. Cl.$^3$ .............................................. G21C 3/42
[52] U.S. Cl. ..................................... 252/635; 252/634
[58] Field of Search ............... 252/638, 636, 634, 635, 252/301.16, 626; 568/853, 852

[56] References Cited

U.S. PATENT DOCUMENTS

| | | | |
|---|---|---|---|
| 3,776,987 | 12/1973 | Grimes et al. | 252/634 |
| 3,781,216 | 12/1973 | Hackstein et al. | 252/635 |
| 3,888,787 | 6/1975 | Hein et al. | 252/635 |
| 4,209,492 | 6/1980 | Naefe | 252/635 |
| 4,224,258 | 9/1980 | Langenet et al. | 252/635 |

FOREIGN PATENT DOCUMENTS

| | | | |
|---|---|---|---|
| 757713 | 3/1971 | Belgium | 252/635 |
| 2671051 | 10/1972 | Fed. Rep. of Germany | 252/635 |
| 2459445 | 7/1976 | Fed. Rep. of Germany | 252/635 |
| 2519747 | 11/1976 | Fed. Rep. of Germany | 252/625 |
| 2823238 | 10/1979 | Fed. Rep. of Germany | 568/635 |

*Primary Examiner*—Werren B. Lone

*Attorney, Agent, or Firm*—Frishauf, Holtz, Goodman & Woodward

[57] ABSTRACT

Sorbitol, or another polyalcohol such as erythritol, dulcitol or xylitol, is added to a solution containing uranyl nitrate which may also contain another heavy metal, such as throium or plutonium, prior to preneutralization with ammonia in order to provide a highly viscous solution that can be preneutralized to a great extent without premature precipitation of uranium. The high viscosity makes possible the formation of favorably large drops when the solution is dripped into an ammonia containing bath for external gelification of the drops. According to the pouring apparatus used, the particles after washing, drying and sintering have a diameter between 0.6 and 1.5 mm. The polyalcohol is added to a hydrosol containing from 1.5 to 2 moles per liter of heavy metal, the polyalcohol being added until concentration of one-third mole of polyalcohol per mole of heavy metal is reached. In certain cases up to four moles of ammonium nitrate per liter are added. The solution so produced can be preneutralized with up to 90% of the amount of ammonia stoichiometrically necessary for the separation of uranium without the formation of any precipitate, preferably by first adding ammonia gas under strong stirring and then adding ammonium bicarbonate in excess, which decomposes to liberate ammonia to an extent determined by the temperature, which is to be precisely controlled. It is possible to obtain this way a solution of predetermined viscosity from which the excess ammonium bicarbonate can readily be separated.

11 Claims, No Drawings

URANYL NITRATE POURING SOLUTION FOR PRODUCING NUCLEAR FUEL PARTICLES AND A METHOD FOR ITS PREPARATION

The invention concerns a solution containing uranyl nitrate for the production of spherical nuclear fuel particles of uranium oxide and/or uranium carbonide and/or a uranium-containing mixed oxide or mixed carbide. The solution is preneutralized with ammonia and then dripped into an ammonia-containing phase to produce the particles. The invention comprehends both an improved solution for this purpose and the method of its preparation.

Methods of producing nuclear fuel or nuclear breeder material particles, herein referred collectively as "nuclear fuel particles" for simplicity of expression, by wet chemistry have become well known. In such methods solutions or hydrosols, both of which are referred to generically herein as solutions, containing the nuclear fuel material are separated into droplets which are then solidified by chemical reaction. From the "greenlings," as these particles are called in ceramics terminology, there are obtained, as end products, by further processing steps such as washing, drying and sintering, ceramic spherical particles that have a diameter between 0.1 and 1 mm.

For producing carbide nuclear fuel particles, the pouring solutions also contain carbon in suspended form. Along with uranium, the pouring solutions may have thorium and/or plutonium added to them as nuclear fuel material.

For making particles of uranium oxide and/or uranium carbide and/or a uranium-containing mixed oxide or mixed carbide, it is known to drop a hydrosol of tetravalent uranium into 2-ethyl-hexanol (see P. A. Haas et al, "Preparation of Reactor Fuel by Sol-Gel Processes," *Chem. Eng. Progress*, Symp. Ser., Vol. 63 (80), New York, 1967 (pp. 16–27). The solidification of the drops takes place within the organic solution by extraction of water from the drops. This process is inefficient because, in particular, the water content of the 2-ethyl-hexanol must always be exactly controlled and the drops of the hydrosol solidify only slowly. There is the further disadvantage that tetravalent uranium oxidizes very rapidly in contact with air, so that production and treatment of the hydrosol can be carried out only under exclusion of air, since otherwise the uranium in the hydrosol would be precipitated in crystalline form.

In order to avoid dealing with tetravalent uranium, processes have been developed that permit the use of hexavalent uranium, U(VI), in the pouring solution in the form of uranyl nitrate, $UO_2(NO_3)_2$.

An uranyl nitrate solution is accordingly known to which urea (for complex formation with $(UO_2)^{2+}$ and hexamethylene tetramine are added. This solution is dripped into a hot organic solvent, the hexamethylene tetramine decomposes by splitting off ammonia and the initiated precipitation of uranium then solidifies the drops (as disclosed in German Pat. No. 1960289). Since by this process principle ammonia is generated in the drops themselves, this is called "internal gelification." It is still not possible in all cases to avoid precipitation of the uranium by slow decomposition of the hexamethylene tetramine even before the dripping of the solution into the organic solvent. The pouring solution is stable only for a short period.

Processes providing "external gelification" of the drops are also known. Thus, solutions or hydrosols containing nuclear fuel or breeder materials are preneutralized with ammonia or ammonia-providing materials and then dripped into an ammonia-containing bath. By "preneutralization" is understood a raising of the pH value of the pouring solution by a quantity of ammonia that lies below the stoichiometrically necessary amount for the precipitation of the uranium out of the pouring solution.

For thickening such solutions, it is known to add methylcellulose in combination with tetrahydrofurfuryl alcohol. The low heavy metal concentration of the pourting solution on the one hand and the high tetrahydrofurfuryl alcohol concentration on the other hand are disadvantageous. Furthermore, the methylcellulose disturbs the further treatment of the particles (see *Energia Nucleare*, 17 (1970, pp. 217–224).

Another process with external gelification is known in which the $UO_2(NO_3)_2$ solution contains urea and ammonium nitrate. The lower viscosity of this pouring solution, however, makes it necessary to use for the production of particles of larger diameter, a precipitation bath consisting of two phases, one organic and one aqueous. Double stream nozzles are utilized for generating drops. Recycling of the organic phase is also necessary, as described in German Pat. No. 23 23 072.

It has also been proposed to add to a $UO_2(NO_3)_2$ solution of relatively low concentration, along with urea and ammonium nitrate, polyvinyl alcohol for increasing the viscosity (see Energia Nucleare, 17 (1970, pp. 217–224). The diameter of the particles produced by dripping this solution is still limited to 0.2 mm, measured after sintering.

SUMMARY OF THE INVENTION

It is an object of the invention to provide a pouring solution containing uranyl nitrate suitable for external gelification of the drops which can be to a great extent preneutralized at high uranium concentration and is highly viscous.

Briefly, the invention is based on the recognition that the formation of precipitates upon addition of ammonia in uranyl nitrate solutions can be inhibited, or caused to take place only upon addition of substantially larger amounts of ammonia, if a polyalcohol of the group described below is present in the solution. On this basis, by the addition of polyalcohol, and particularly of sorbitol, according to the invention, sufficient polyalcohol is incorporated in the solution to provide the result that at the desired viscosity no precipitate is formed. Particularly effective, was found to be the addition of such a polyalcohol in pouring solutions that contained 20% or more of uranyl nitrate with reference to the aggregate heavy metal content of the solution. It has been found that an addition of such a polyalcohol until a concentration is reached of one-third mole of polyalcohol per mole of heavy metal in the solution is sufficient. Along with sorbitol, polyalcohols found suitable for practice of the invention are ethythritol, xylitol and dulcitol.

The pouring solution containg one of the above-mentioned polyalcohols lends itself advantageously to the addition of ammonia for preneutralization, which may be added up to 90% of the amount of ammonia necessary stoichiometrically for the precipitation of the uranium. Thus, a highly viscous hydrosol is formed from which large drops can be produced. According to the pouring device used, sintered nuclear fuel particles can be produced from such a pouring solution that have diameters up to about 1.5 mm.

The preparation of the pouring solution according to the invention is performed by the addition of the polyalcohol material, preferably sorbitol, to a pouring solution containing uranyl nitrate prior to the addition of ammonia. Preferably, the polyalcohol is added to the pouring solution until a concentration of one-third mole per mole of heavy metal is reached. It is then possible to perform preneutralization of the pouring solution with up to 90% of the amount of ammonia stoichiometrically necessary for the separation of the uranium.

Further development of the invention has brought forth the desirability of setting the heavy metal concentration in the pouring solution so that 1.5 to 2 moles of heavy metal are contained per liter of hydrosol, preferably 1.8 moles per liter. For optimizing the precipitation reaction in the drops of the pouring solution when they fall through the ammonia-containing phase, it has been found useful in some cases to add up to four moles per liter of ammonia nitrate $NH_4NO_3$ to the pouring solution.

It has been found that upon reaching high preneutralization, the viscosity of the hydrosol increases noticeably even by the addition of small quantities of ammonia. In order to introduce the desired maximum quantity of ammonia into the pouring solution, it is therefore contemplated in the further development of the process, first to introduce the greatest portion of the predetermined quantity of ammonia in the form of ammonia gas to the solution containing the polyalcohol with strong stirring and then to establish the end value of ammonia addition by the addition of ammonia hydrogen carbonate.

Ammonium hydrogen carbonate decomposes with splitting off of ammonia in the pouring solution which is acid as the result of hydrolysis. The amount of $NH_4HCO_3$ that decomposes upon the temperature in the solution. The decomposition stops when a definite temperature is maintained. By the addition of ammonium hydrogen carbonate in excess while the temperature is precisely controlled or observed, it is possible thus to establish the preneutralization and thus the viscosity of the polyalcohol containing hydrosol very exactly. The temperature range used lies between 15° and 40° C. The viscosity of the hydrosol containing 1.8 moles per liter of heavy metal may be set in this manner at between 10 and $10^3$ mPa.s (millipascal-seconds). Higher viscosity values are also obtainable, but such hydrosols cannot be dripped without additional difficulty or expense. After separation of the excess of $NH_4HCO_3$ by filtration, the hydrosol is ready for the dripping step.

If $UC_2$ particles are to be produced, carbon is added in colloidal form to the hydrosol in the manner that in itself already known.

For pouring the hydrosol, various known devices are suitable for production of nuclear fuel particles by external gelification of the drops.

If a pouring device is used such as is described in *Energia Nucleare*, 17 (1970, pp. 217-224), spherical sintered particles of a diameter up to 0.6 mm can be produced. By use of a device according to German Pat. No. 27 14 873, the maximum diameter is raised to 0.8 mm. If spherical particles with diameters up to 1.5 mm are to be produced, a two-phase pouring column as described in German Pat. No. 27 47 472 can be utilized.

The further treatment of the gelified drops can for example, be carried out as follows:

First, the $NH_4NO_3$ contained in the particles is removed by washing with water. Then the particles are slowly dried in sufficiently moistened air. It has been found useful to raise the temperature to 500° C. in about six hours. In this treatment, the sorbitol contained in the particles is fully consumed by combustion. Following this heating, hydrogen is caused to flow over the particles in order to produce uranium dioxide $UO_2$. The sintering temperature is about 1450° C.

If carbon in colloidal form is added to the hydrosol in order to produce $UC_2$, the heat treatment of the gelified particles is performed in an inert gas or hydrogen atmosphere, in order to prevent the burning of the carbon. The carbothermic reduction of $UO_2$ to $UC_2$ is carried out at temperatures above 2000° C.

EXAMPLE 1

For producing one liter of a 1.8 molar sol, 903 g of $UO_2(NO_3)_2$ and 288 g of $NH_4HO_3$ were dissolved in water. 109 g of sorbitol were added to the solution. Then, while stirring with a dispergator, 44 g of ammonia gas were introduced into the solution. Immediately thereafter, with further stirring, 50 g of $NH_4HCO_3$ were added. The temperature during this preneutralization of the pouring solution was 25° C. The excess $NH_4HCO_3$ was then separated from the prepared hydrosol by decantation. The viscosity of the hydrosol measured 180 mPa.s, the pH value 2.9.

The hydrosol was poured in a pouring apparatus according to German Pat. No. 27 14 873. The gelified drops were washed with water and freed of $NH_4NO_3$ and then heated within six hours. Thereafter, the particles were reduced in an argon atmosphere containing 4% by volume of hydrogen and, finally, the particles were sintered at a temperature of 1450° C.

The diameter of the sintered particles was 0.9 mm. The spherical shape was close to ideal: the maximum ratio of greatest to smallest diameter of a particle measured 1.03.

EXAMPLE 2

One liter of a 1.8 molar sol was prepared in the same way as in Example 1. The temperature during the preneutralization of the pouring solution with $NH_4HCO_3$ was in this case set at 22° C., however. The viscosity of the hydrosol after this treatment measured 57 mPa.s.

For production of the particles, a two-phase pouring column was utilized, such as is described in German Pat. No. 27 47 472. The gelified drops taken from the pouring column were dried and sintered in the same manner as described in Example 1.

The diameter of the sintered particles was 1.2 mm and the maximum ratio of greatest to smallest diameter of a particle was measured as 1.05.

EXAMPLE 3

For separation of one liter of a hydrosol containing uranium and thorium, 0.9 moles of $UO_2(NO_3)_2$ and 0.9 moles of $Th(NO_3)_4$ were dissolved. After the addition of 108 g of sorbitol, 56 of ammonia gas were introduced into the pouring solution. Immediately thereafter, the solution was treated with 15 g of $NH_4HCO_3$. The temperature during preneutralization was 22° C. The hydrosol had a pH value of 2.5 and a viscosity of 44 mPa.s.

The further treatment was performed in the same way as described in Example 1. The diameter of the sintered particles was 0.9 mm.

Erythritol, dulcitol and xylitol, as well as sorbitol, were tested as polyalcohols with equivalent success in the process of the invention. From these other materials also hydrosols could be produced that contained up to 90% of the amount of ammonia stoichiometrically necessary for the separation of uranium from the pouring solution. It was found that polyalcohol is particularly effective when there is more than 20% of uranyl nitrate in the hydrosol with reference to the total heavy metal content of the pouring solution.

The above-mentioned polyalcohols are also usable in pouring solutions that contain plutonium along with uranium. In such pouring solutions, also, it is possible to reach a high preneutralization and a high viscosity of the pouring solution by the addition of the polyalcohol.

Although the invention has been described in detail with reference to particular examples, it will be understood that variations and modifications are possible within the inventive concept. For example, it is not necessary to raise the polyalcohol content of a hydrosol as high as ⅓ mole per mole of heavy metal. In some cases, particularly if large particles and hence high solution viscosity are not required, some benefit from the invention is obtainable with as little as 1/10 mole of polyalcohol per mole of heavy metal.

I claim:

1. A pouring solution containing uranyl nitrate for the production of spherical nuclear fuel particles by dripping into an ammonia-containing phase after preneutralization with ammonia, which solution has the improvement which consists in that it has a content of polyalcohol material selected from the group consisting of sorbitol, erythritol, xylitol, dulcitol and mixtures of one or more of them which is of such relative magnitude that for a predetermined viscosity of the solution, no precipitate is produced in the preneutralized state of said solution.

2. A solution as defined in claim 1 in which said polyalcohol material content consists at least in major part, of sorbitol.

3. A solution as defined in either claim 1 or claim 2 in which said polyalcohol material content lies in the range of 1/10 to ⅓ mole per mole of heavy metal.

4. A method of producing a pouring solution containing uranyl nitrate for the production of spherical particles of nuclear fuel by dripping into an ammonia-containing phase after preneutralization with ammonia, which method comprises the steps of adding, prior to preneutralization with ammonia a polyalcohol material selected from the group consisting of sorbitol, erythritol, xylitol and dulcitol and mixtures of them to the uranyl nitrate solution in an amount sufficient to prevent precipitation up to a predetermined value of solution viscosity.

5. A method as in claim 4 in which said polyalcohol material addition to the uranyl nitrate solution consists, at least in major part, of sorbitol.

6. A method as defined in either claim 4 or claim 5 in which the amount of said polyalcohol material addition to the uranyl nitrate solution is sufficient to bring the polyalcohol content of the solution to between 1/10 and ⅓ mole of said polyalcohol material per mole of heavy metal.

7. A method as defined in claim 6 in which the heavy metal solution to which said polyalcohol material is added is a hydrosol containing between 1.5 to 2 moles of heavy metal per liter.

8. A method as defined in claim 7 in which said heavy metal concentration is about 1.8 moles per liter.

9. A method as defined in claim 6 in which ammonium nitrate is added to said solution containing uranyl nitrate, either before or after said polyalcohol material addition, in an amount not exceeding 4 moles per liter.

10. A method as defined in claim 6 in which the preneutralization with ammonia is performed by first introducing ammonia gas during strong stirring of the solution and then ammonia is introduced by the decomposition of ammonium hydrogen carbonate added to the solution.

11. A method as defined in claim 10 in which ammonium carbonate is present in excess in the solution of uranyl carbonate at least prior to the introduction of ammonia gas, and is decomposed by maintaining the solution at a temperature between 15° and 40° C., and in which method the excess ammonium hydrogen carbonate is thereafter separated from the solution.

* * * * *

UNITED STATES PATENT AND TRADEMARK OFFICE
CERTIFICATE OF CORRECTION

PATENT NO. : 4,384,990
DATED : May 24, 1983
INVENTOR(S) : Kurt Hein et al.

It is certified that error appears in the above-identified patent and that said Letters Patent is hereby corrected as shown below:

On the title page, item [75] should read -- Kurt Hein and Eric Zimmer, both of Julich, Fed. Rep. of Germany --.

Signed and Sealed this

Twenty-seventh Day of March 1984

[SEAL]

Attest:

GERALD J. MOSSINGHOFF

Attesting Officer

Commissioner of Patents and Trademarks